United States Patent [19]
Wittkopf

[11] Patent Number: 6,059,003
[45] Date of Patent: May 9, 2000

[54] WEB HEATING AND PRESSING APPARATUS

[75] Inventor: Eugene W. Wittkopf, Suamico, Wis.

[73] Assignee: Integrated Design Corporation, Green Bay, Wis.

[21] Appl. No.: 09/124,100

[22] Filed: Jul. 29, 1998

[51] Int. Cl.[7] .................................................. B30B 3/00
[52] U.S. Cl. ...................... 156/555; 156/582; 156/583.1; 100/334; 100/176
[58] Field of Search .................................. 156/498, 555, 156/580, 581, 582, 583.1, 583.4; 100/334, 176

[56] References Cited

U.S. PATENT DOCUMENTS

| | | | |
|---|---|---|---|
| 4,310,365 | 1/1982 | Elliott et al. | 156/55 |
| 4,376,671 | 3/1983 | Schulz | 156/549 |
| 4,519,757 | 5/1985 | Wittkopf et al. | 425/143 |
| 5,058,496 | 10/1991 | Wittkopf | 100/35 |
| 5,356,507 | 10/1994 | Wojtanowitsch et al. | 156/555 |
| 5,464,690 | 11/1995 | Boswell | 428/334 |
| 5,618,378 | 4/1997 | Cahill | 156/552 |
| 5,686,168 | 11/1997 | Laurent et al. | 428/179 |
| 5,853,531 | 12/1998 | Murphy et al. | 156/555 |
| 5,902,433 | 5/1999 | Becher | 156/209 |

OTHER PUBLICATIONS

5–page publication by DMS Incorporated; undated but admitted prior art.
4–page publication by I. Kela Company; undated but admitted prior art.
12–page publication by Total Register Inc.; undated but admitted prior art.

*Primary Examiner*—James Sells
*Attorney, Agent, or Firm*—Senniger, Powers, Leavitt & Roedel

[57] ABSTRACT

Hot stamping apparatus and embossing apparatus for the production of holographic images on a substrate web, each apparatus comprising a heated roll and an anvil each having trunnions at its ends journalled for rotation in bearings in a frame with a cooling system for cooling the bearings for all the trunnions and for cooling the trunnions of the heated roll.

19 Claims, 13 Drawing Sheets

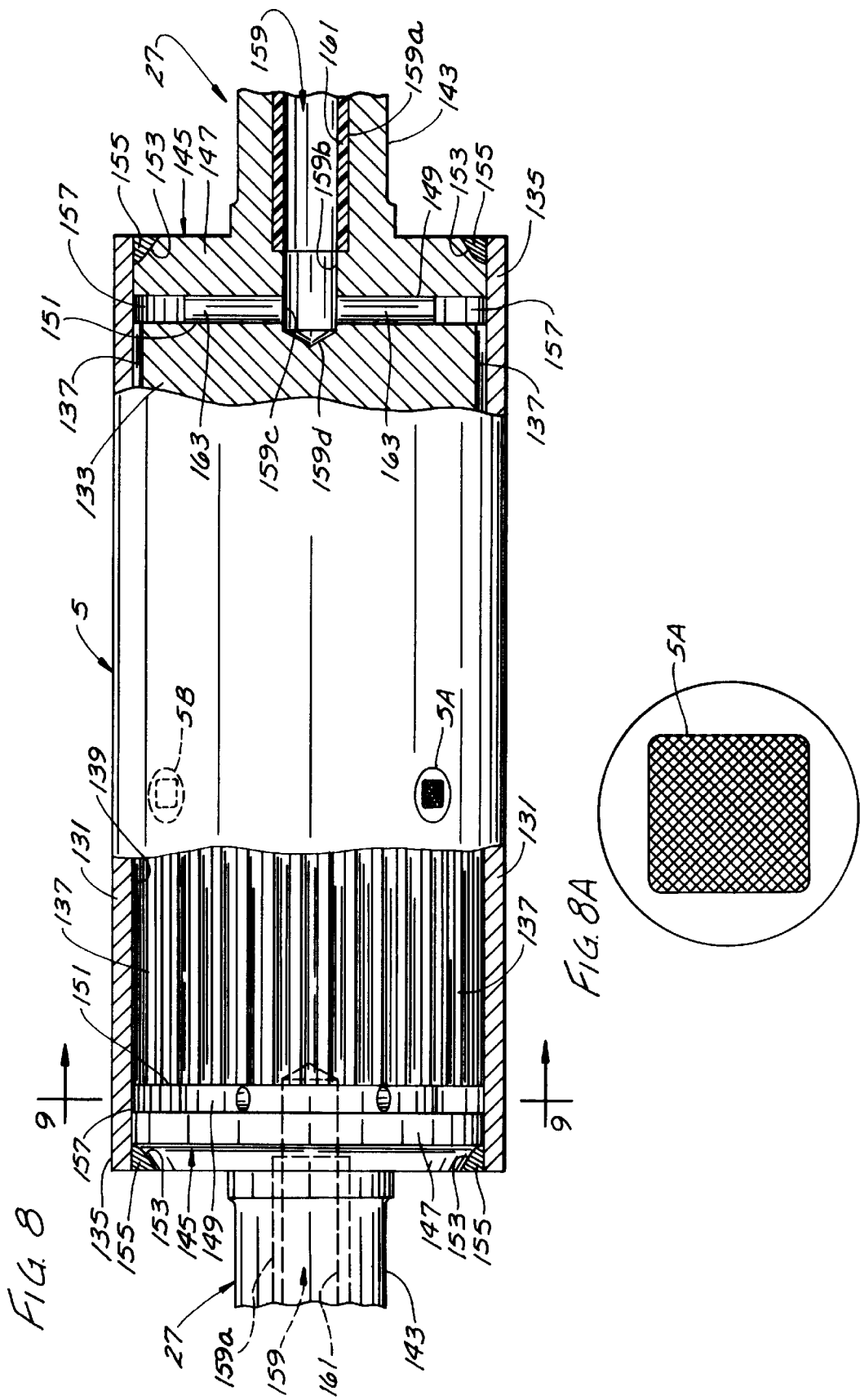

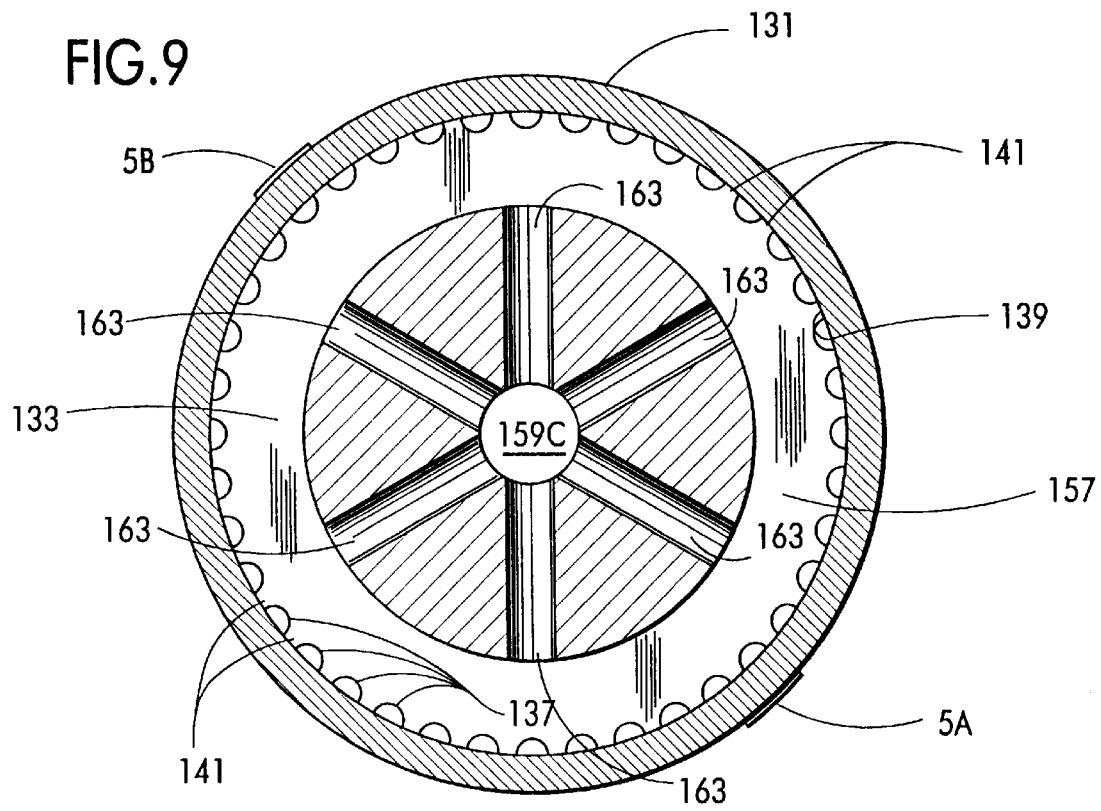

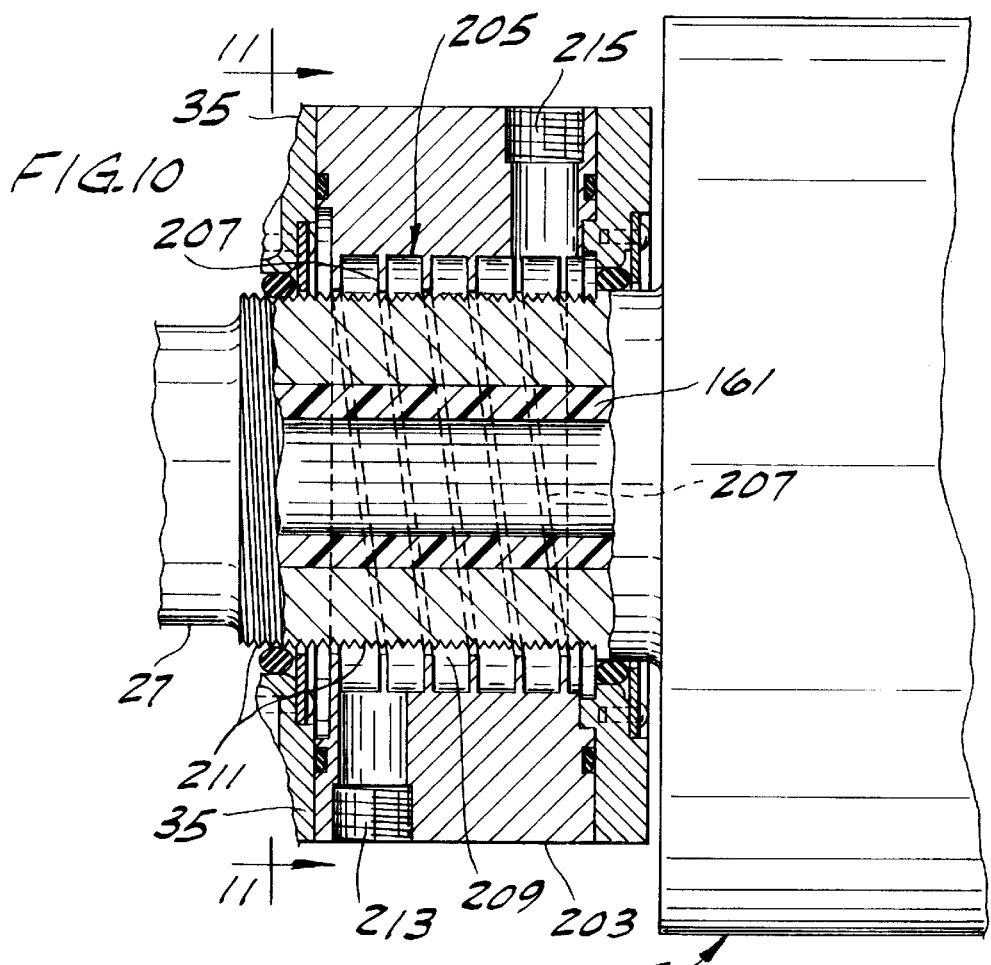
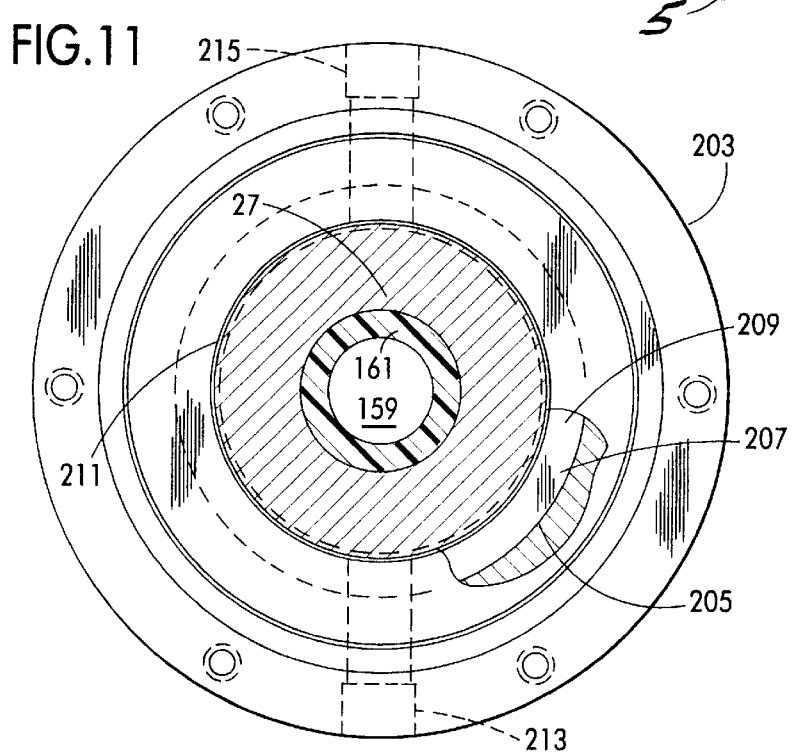

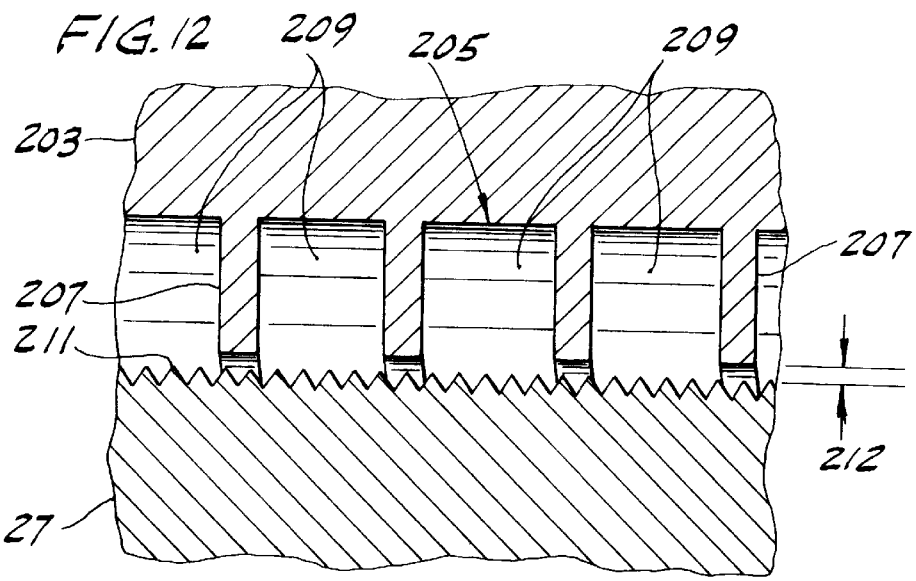
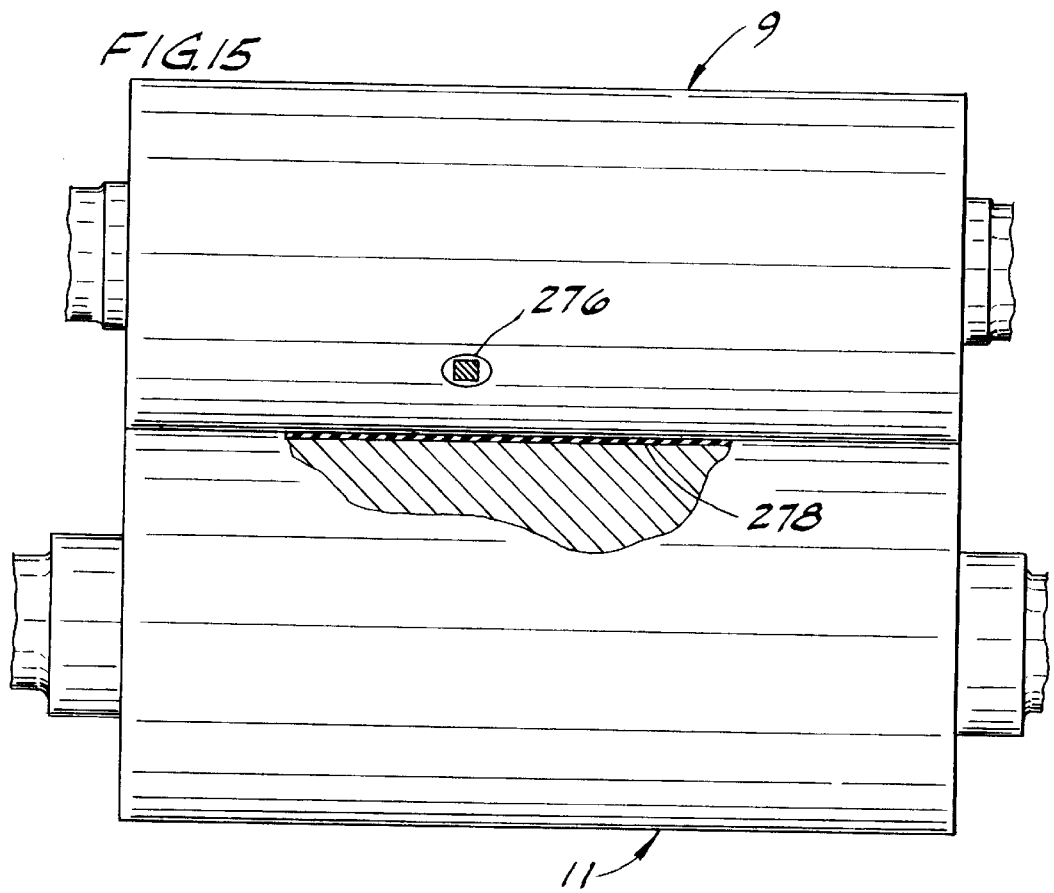

WEB HEATING AND PRESSING APPARATUS

BACKGROUND OF THE INVENTION

This invention relates to web heating and pressing apparatus, more particularly to such apparatus comprising a heated roll and a backing or anvil roll between which superimposed webs are fed for pressurized heat-transfer contact of the heated roll with one of the webs, and specifically to such apparatus for use in the application of foil areas and the embossing of the foil areas for the production of holographic images on a substrate web such as a paper web.

Reference is made to U.S. Pat. No. 5,464,690, issued Nov. 7, 1995, entitled Holographic Document and Method for Forming, hereinafter referred to as the '690 patent, and incorporated herein by reference, showing in FIG. 6 thereof a document having a security holographic image thereon to prevent counterfeiting, reference being made in column 4, lines 1–3 of this patent to the document being a stock certificate or check, or any other desired document upon which it is desired to have embossed a diffraction grating image or a hologram. The document is described in the '690 patent as comprising a substrate of plain or printed paper, coated paper or plastic film (the "document substrate") having a "chip" bearing the holograph image identified by the reference numeral 16.

As illustrated in FIG. 4 of the '690 patent, a continuous web 20 (the "document substrate"), which is ultimately segmented into individual sheets constituting the documents, is intermittently fed forward through a stamping station wherein a composite sheet or web 10 of the so-called "x-factor" construction including foil layer C is intermittently fed over web 20 transversely thereof and, during dwell intervals, a hot stamping head 26 carrying a die 28 is driven down to press down on the composite sheet 10 causing a portion of the composite strip constituting the "chip" $10^1$ to adhere to the web 20. The chip $10^1$, adhering to the web 20, separates from the composite sheet, and the web 20 with chips $10^1$ adhered thereto feeds forward through an embossing station where each chip (having the foil layer C) is embossed to produce the hologram image thereon. FIG. 5 of the '690 patent shows an alternative procedure wherein the web 20 is continuously fed forward with the composite sheet or web 10 superimposed on the web 20 and extending in the same direction as the web 20, the composite sheet or web 10 having heat and pressure applied thereto to punch out chips $10^1$ from the composite sheet and cause them to adhere to the web, each chip having the foil layer C which is subsequently embossed to produce the holographic image thereon.

This invention involves apparatus for use in an installation for continuous feed therethrough of the paper or film substrate, which may be referred to as the base web, with the chip-forming web (which may be referred to as the foil web) thereon for carrying out the stamping operation at the stamping station to stamp or punch out the chips and cause them to adhere to the base web, ahead of the embossing station, and apparatus for use in the installation at the embossing station for embossing the chips. In respect to the function of the stamping apparatus to apply heat and pressure in the limited area of the foil web, and the function of the embossing apparatus to apply heat and pressure in the limited area of each chip, apparatus of this invention is herewith broadly entitled "Web Heating and Pressing Apparatus", noting also that it is contemplated that the principles of the apparatus may be applicable to apparatus other than the herein-disclosed apparatus for stamping the foil web superimposed or the substrate on the base web and the apparatus for embossing the chips.

Reference is also made to U.S. Pat. No. 5,618,378 issued Apr. 8, 1997, entitled Apparatus for Applying Images, Particularly Security Images to Banknotes, hereinafter referred to as the '378 patent, and incorporated herein by reference, involving apparatus for applying a series of images (holographic security images) to moving stock (material in sheet or web form), especially for its disclosure of what may be termed "incremental feed" of the images, i.e. feed of closely spaced images onto the moving stock at intervals greater than the spacing of the images. This '378 reference is incorporated herein by reference since the above-described installation in which stamping apparatus of the present invention may be used may utilize the "incremental feed" principle thereof for feeding the foil web to said stamping apparatus.

Reference is made further to the co-assigned U.S. Pat. No. 5,058,496 issued Oct. 22, 1991, entitled Roll Apparatus with Cooling System for Maintaining Constant Gap Size and Method, hereinafter referred to as the '496 patent, showing a die cutter comprising a pair of rolls each having trunnions at its ends journalled for rotation in bearings in the frame with a cooling system for the bearings wherein a coolant is pumped through the bearings and the temperature of the coolant is controlled by a temperature sensor associated with the frame. This '496 patent is incorporated herein by reference since the present invention may utilize a similar coolant temperature control system.

Reference is also made to U.S. Pat. No. 4,519,757 issued May 28, 1985, entitled Web Surface Treating Apparatus, hereinafter referred to as the '757 patent, showing apparatus including heated rolls 5, 7 and 9 each constructed for circulation of heated liquid therethrough. This '757 patent is incorporated herein by reference since the present invention may utilize similar heated rolls.

BRIEF SUMMARY OF THE INVENTION

Among the several objects of the invention may be noted the provision of web heating and pressing apparatus comprising a heated roll and an anvil roll between which web material is fed for application of heat and pressure thereto, said rolls having trunnions journalled in bearings, with a cooling system for cooling the bearings of both rolls and the trunnions of the heated roll to reduce transfer of heat to the frame for dimensional stability of the frame; the provision of such apparatus, more particularly stamping apparatus for the application of foil areas ("chips") on a substrate web, such as a web of paper or film web for the production of holographic images thereon; the provision of such apparatus, more particularly embossing apparatus, for embossing each chip with a holographic image; and the provision of such apparatus capable of relatively high speed operation in the production of the substrate web with the chips for subsequent embossing of the chips and the embossing of the chips, needing adjustment relatively infrequently.

In general, web heating and pressing apparatus of this invention comprises a frame, a heated roll and an anvil roll each having trunnions at its ends journalled for rotation in bearings in the frame with the axes of the rolls at least substantially parallel and with the rolls so mounted as to provide a web pass plane between the rolls, and a cooling system for cooling the bearings for the trunnions of the heated roll, for cooling the bearings for the trunnions of the anvil roll and for cooling the trunnions of the heated roll. The cooling system comprises passaging for flow of coolant in heat-transfer relation with the bearings for the trunnions of the heated roll, passaging for flow of coolant in heat-transfer relation with the bearings for the trunnions of the anvil roll, and a cooling chamber for flow of coolant therethrough in heat-transfer relation to the trunnions of the heated roll, said passaging and cooling chamber being connected in a circuit for circulation of coolant therethrough for cooling the bearings for the trunnions of both rolls and the trunnions of the heated roll.

Other objects and features will be in part apparent and in part pointed out hereinafter.

BRIEF DESCRIPTION OF THE DRAWINGS

FIG. 2A is a view of a fragment of the foil web after stamping;

FIG. 8 is a view showing detail of the heated roll of the stamping apparatus, with parts broken away and shown in section;

FIG. 8A is an enlarged fragment of FIG. 8;

FIG. 9 is a view in section on line 9—9 of FIG. 8;

FIG. 10 is an enlarged fragment of FIG. 7;

FIG. 11 is a view in section on line 11—11 of FIG. 10;

FIG. 12 is an enlarged fragment of FIG. 10;

FIG. 15 is a view of the heated roll and the anvil roll of the embossing apparatus of the invention with the anvil roll partly broken away and shown in section.

Corresponding reference characters indicate corresponding parts throughout the several views of the drawings.

DETAILED DESCRIPTION

Figure 1:
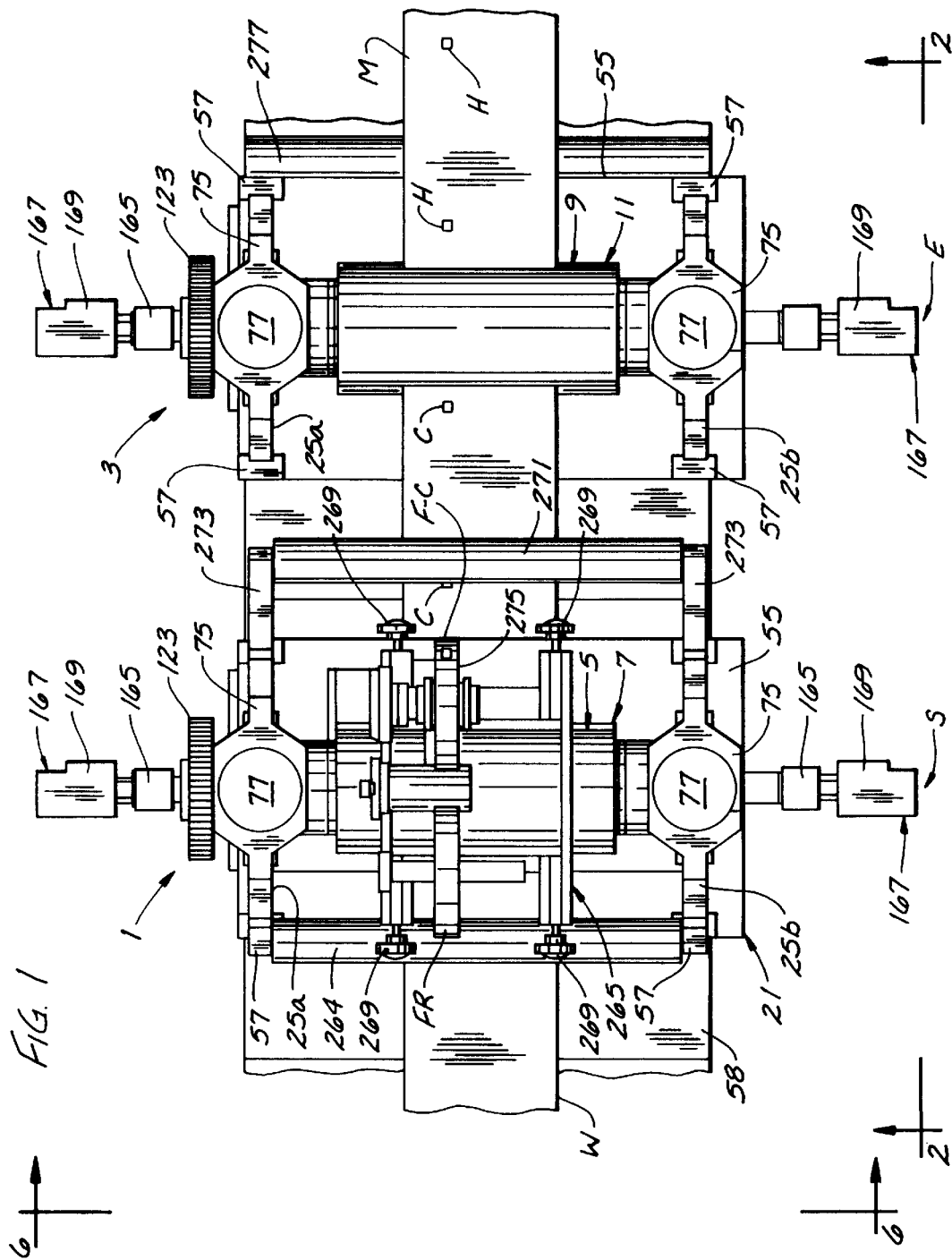
FIG. 1 is a diagrammatic view in plan of an equipment layout including stamping apparatus of this invention for stamping out chips from a web of foil and causing the chips to become adhered to a substrate web, and embossing apparatus of this invention for embossing the chips, parts being omitted.
Figure 2:
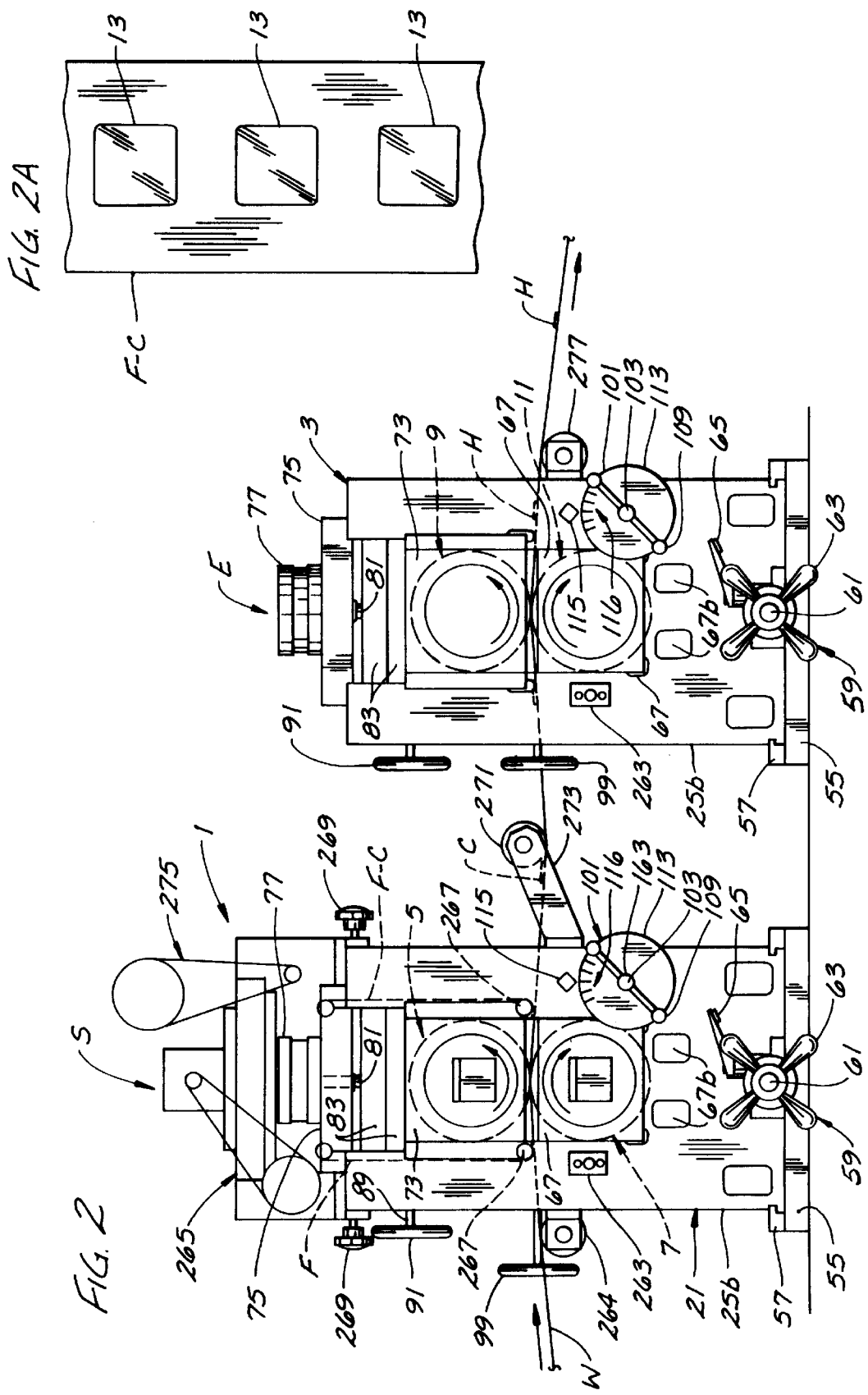
FIG. 2 is a view in side elevation of FIG. 1 taken on line 2—2 of FIG. 1 from the side thereof referred to as the operator's side, parts being omitted.
Figure 3:
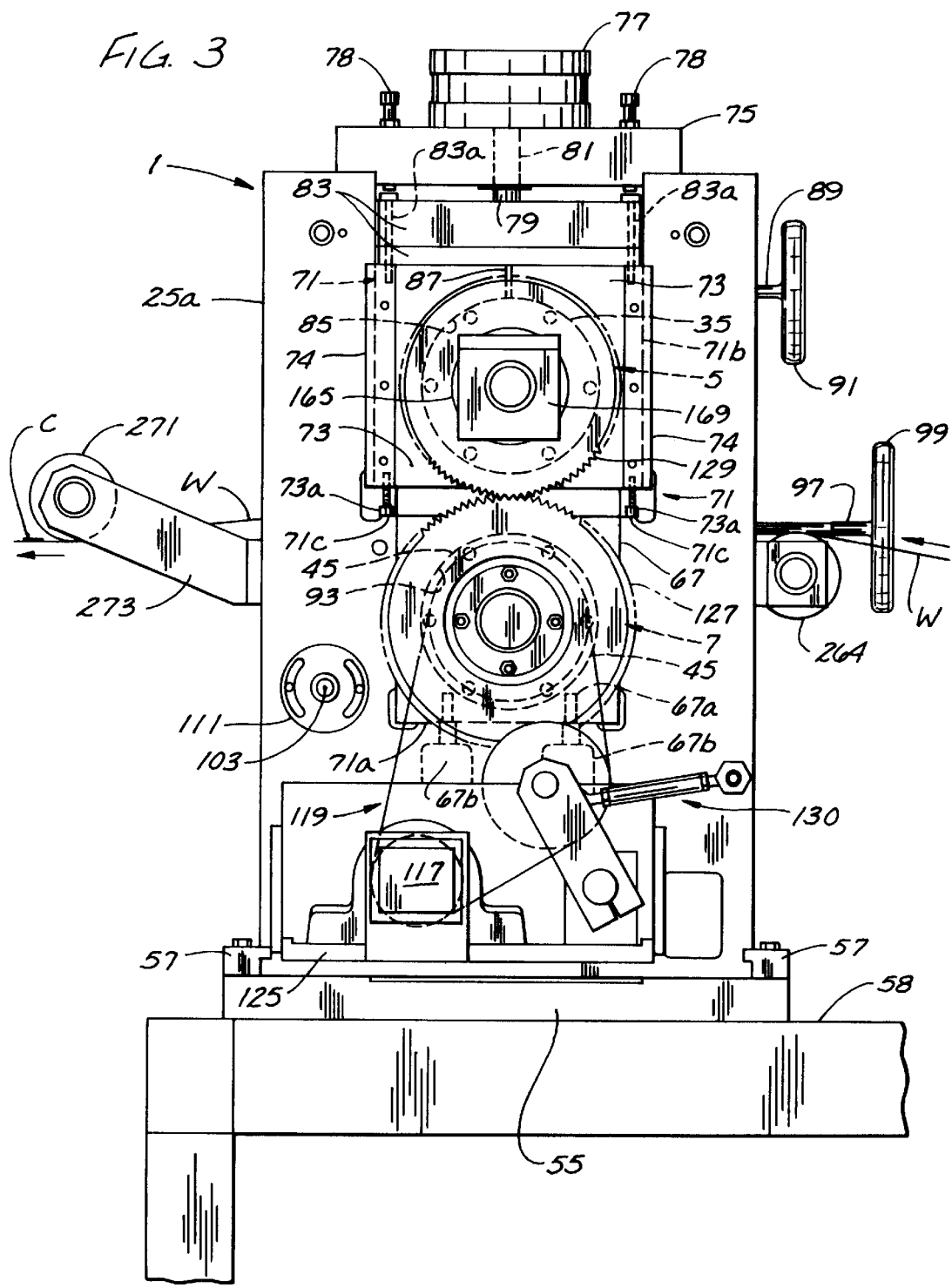
FIG. 3 is a view in side elevation of stamping apparatus of this invention taken from the other side from that shown in FIG. 2, referred to as the drive side.

Referring first to FIGS. 1 and 2 of the drawings, equipment for the production of a continuous web W, such as the web 20 shown in the '690 patent with holographic images H such as the images indicated at 16 in the '690 patent at equally spaced intervals lengthwise thereof, is shown as comprising a stamping station S and an embossing station E corresponding generally to the stamping station 22 and embossing station 23 of the '690 patent. The web W is continuously fed forward by and between a pair of rolls 5 and 7 of stamping apparatus of this invention at the stamping station and a pair of rolls 9 and 11 of embossing apparatus of this invention at the embossing station. The stamping apparatus is designated in its entirety by the reference numeral 1 and the embossing apparatus is designated in its entirety by the reference numeral 3. The web W, which may be hereinafter referred to as the substrate web, e.g. a web of paper or plastic film constituting the "document substrate" or "document web", is fed continuously, from left to right as shown in FIGS. 1 and 2, through these stations. A web F, which may be hereinafter referred to as the foil web, having the x-factor component 10 of the '690 patent with the overlying film substrate A such as described in the '690 patent (shown in FIG. 1 thereof) is fed into overlying relationship with the web W as the latter enters rolls 5 and 7 at the stamping station 1.

As the webs W and F pass between these rolls 5 and 7, chips C corresponding to chips 10 shown in the '690 patent are stamped from the foil web F onto the web W, the chips C being spaced lengthwise of the web W at intervals corresponding to the length of individual sheets into which web w is ultimately segmented. The chips C are adhered to the web W. The foil web F minus the chips C ("F-C") exiting the rolls 5,7 is rewound and may ultimately be recycled. The areas from which the chips C are removed are shown in FIG. 2A as windows 13 corresponding to windows 17 shown in the '690 patent spaced at intervals along the length of the F-C web. The web W with the chips C thereon exiting from the rolls 5 and 7 passes through rolls 9 and 11 of embossing apparatus of this invention at the embossing station 3 where a holographic image H corresponding to image 16 of the '690 patent (a diffraction grating image) is embossed into the exposed surface of the chips, thus completing the production of the continuous substrate web W with the holographic images H at equally spaced intervals (sheet-length intervals) thereon.

Figure 5:
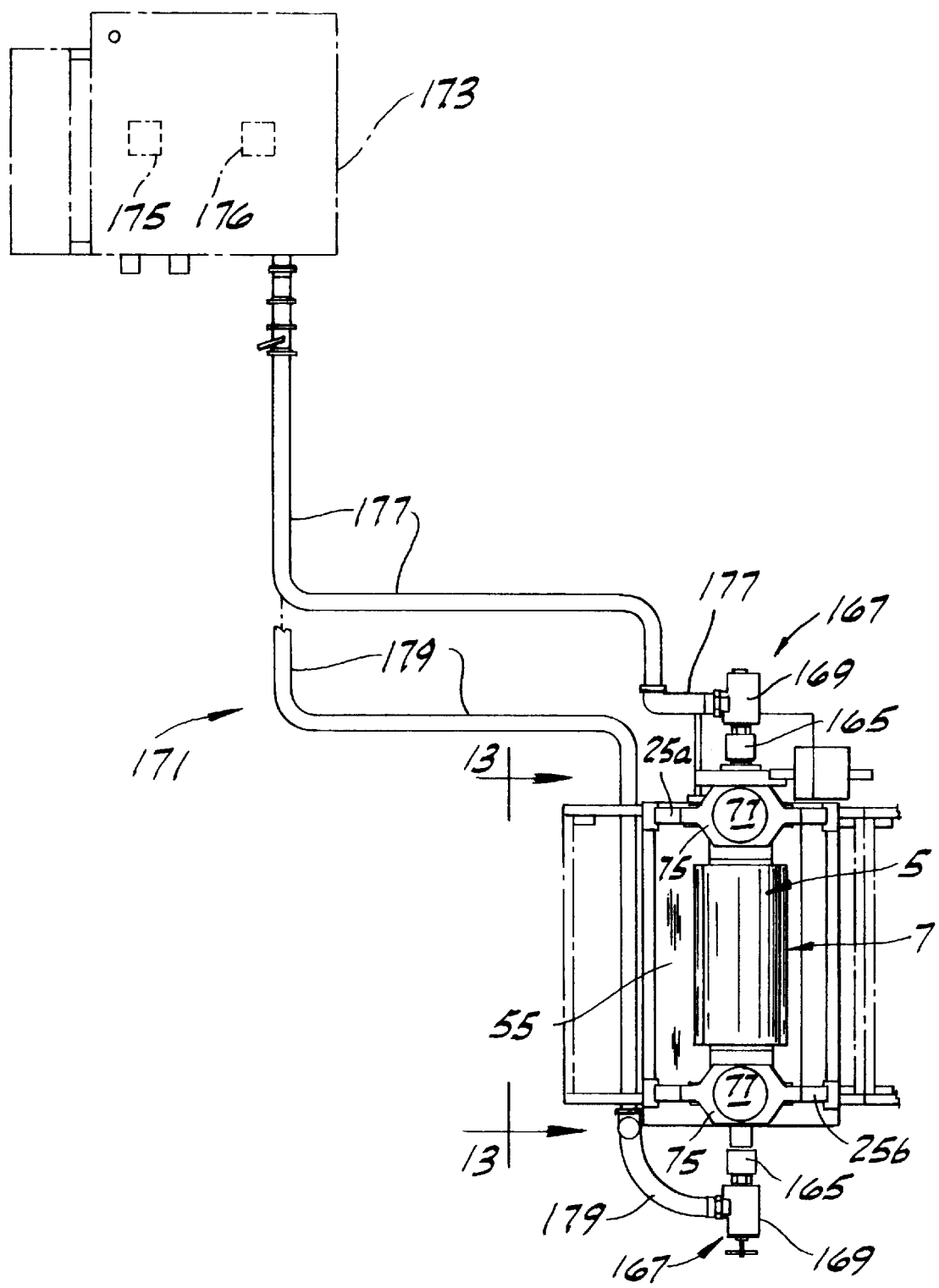
FIG. 5 is a plan view of the stamping apparatus, showing circuitry for circulation of hot oil through the heated roll thereof for heating it, parts being omitted.
Figure 6:
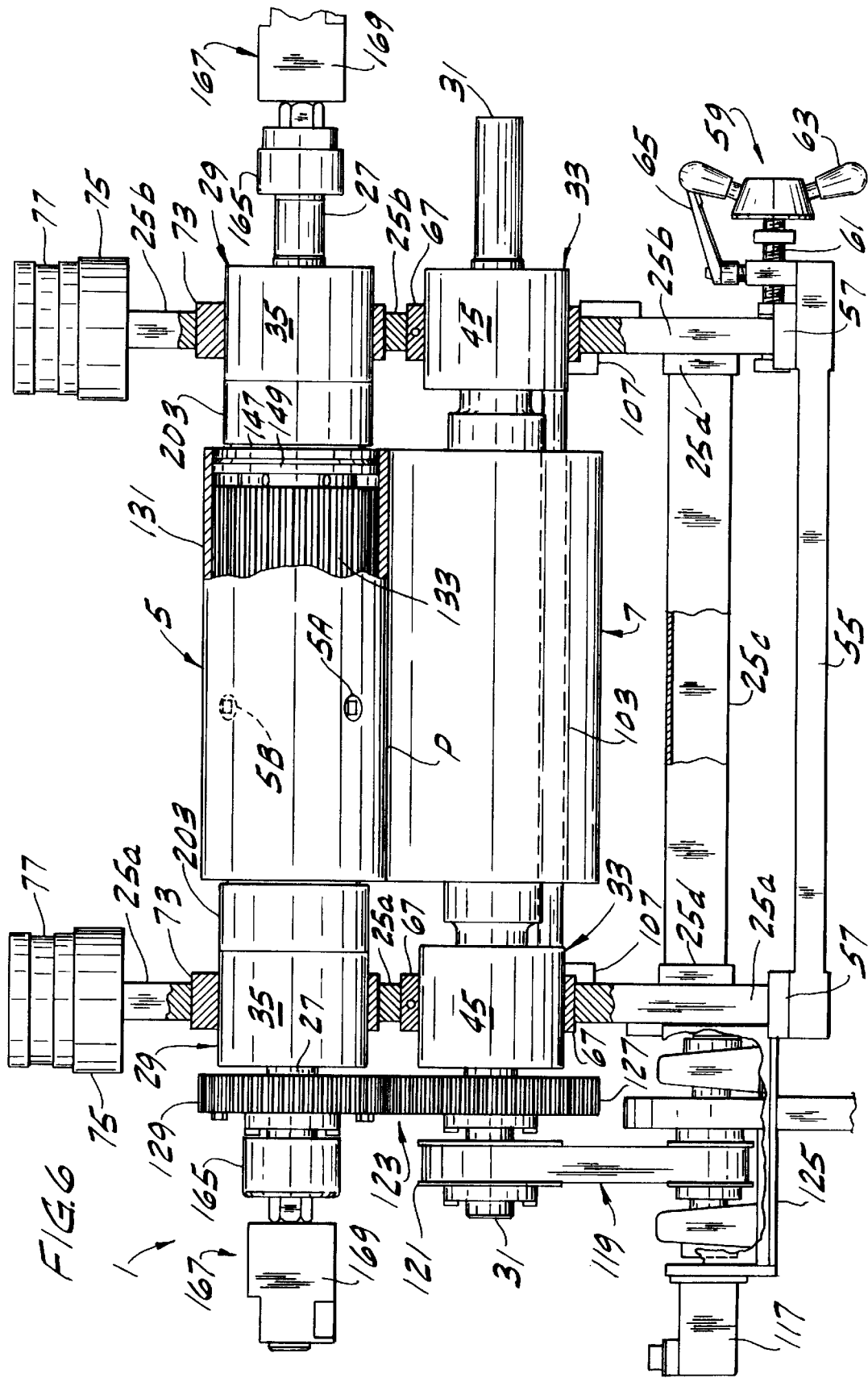
FIG. 6 is a view in elevation of the stamping apparatus on line 6—6 of FIG. 1, with parts omitted and parts broken away and shown in section.
Figure 7:
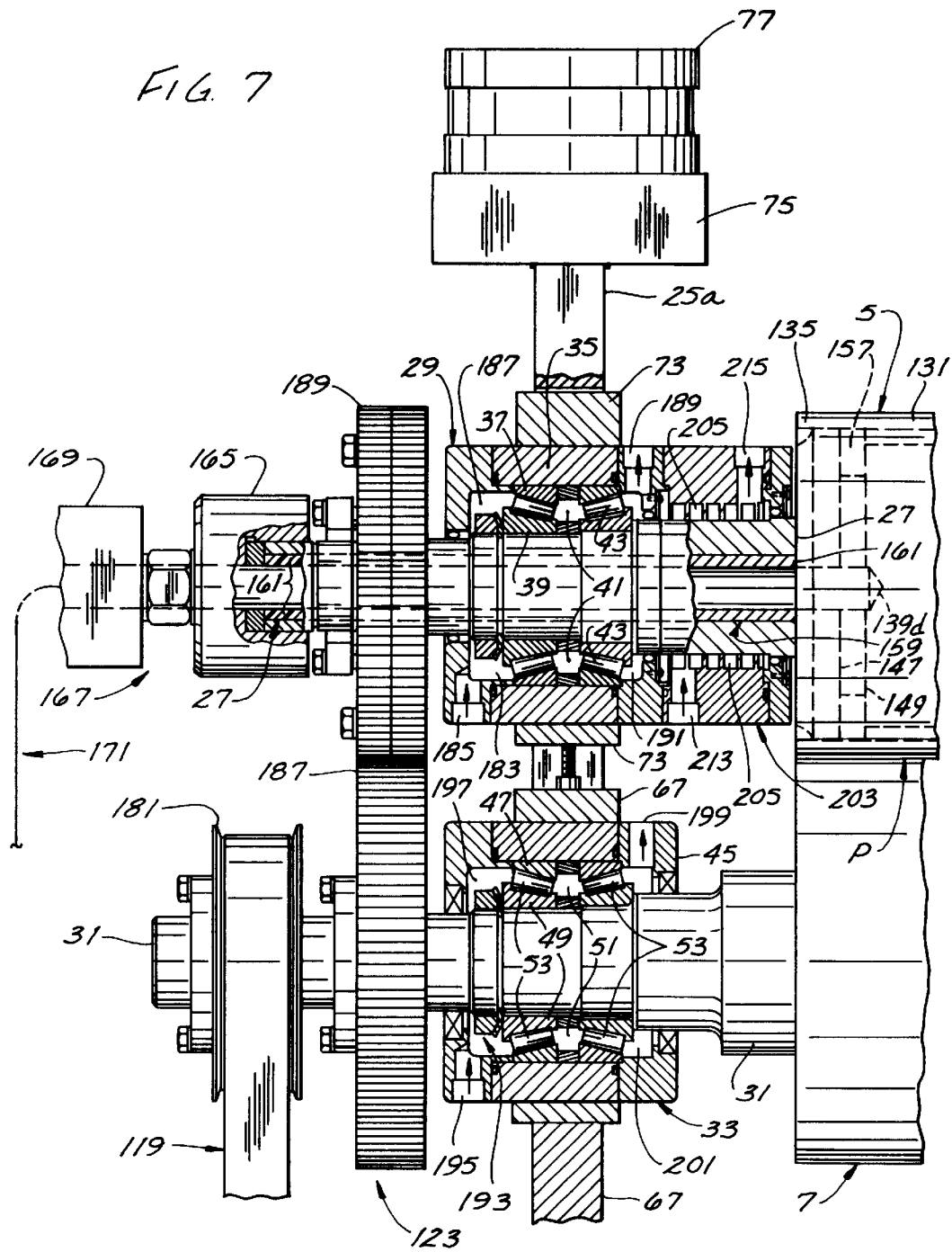
FIG. 7 is an enlarged part of FIG. 6 with parts further broken away and shown in section.

The present invention involves the stamping apparatus generally designated 1 used at the stamping station S for hot stamping the foil web F to stamp out the chips C therefrom and cause them to become adhered to the web W and the embossing apparatus generally designated 3 used at the embossing station E for embossing the chips. The stamping apparatus 1 and embossing apparatus 3 are generally identical (the differences to be subsequently described); and the stamping apparatus 1 will be described first. Referring now to FIGS. 3–7, the stamping apparatus 1 is shown to comprise a frame designated in its entirety by the reference numeral 21, and more particularly to comprise side frame members 25a and 25b "a" referring to what is termed the drive side and "b" referring to what is termed the operator's side of the stamping apparatus. In FIGS. 6 and 7, 25a appears at the left; in FIG. 6, 25b appears at the right, 25a being omitted. The frame includes a cross-bar 25c of channel shape in cross-section extending between the side frame members secured to the insides thereof as indicated at 25d, rigidly holding the side frame members in their spaced-apart vertical parallel relation. Roll 5 previously referred to is a heated roll having trunnions at its left and right ends as shown in FIG. 6, its left end being its end toward the drive side of the apparatus and its right end being its end toward the operator's side of the apparatus. The trunnions are identical, each being designated 27. They are journalled for rotation in bearings each generally designated 29 in the side frame members with the axis of the roll 5 generally horizontal.

Roll 7 previously referred to, paired with roll 5, is a backing or anvil roll having trunnions each designated 31 at its left and right ends as shown in FIG. 6 journalled for rotation below roll 5 in bearings each generally designated 33 in the side frame members 25a, 25b with the axis of roll 7 generally horizontal and generally parallel to the axis of roll 5, with the rolls so mounted as to provide a generally horizontal pass plane P between the rolls for passage of the web F as a first web superimposed on the web W as a second web between the rolls with pressurized heat-transfer contact of the heated roll 5 over two raised areas 5A and 5B thereof each corresponding to the area of a chip C to be formed from the web F superimposed on the web W backed by the anvil roll 7. These raised areas 5A and 5B, which are spaced at 180° intervals around the surface of the heated roll (see particularly FIG. 9) in the transverse plane of the heated roll where the chips C are to be applied function as stamping dies corresponding to the dies 23 and 45 of the '690 patent. The anvil roll 7 may be a steel roll or a hard-rubber-surfaced roll (e.g. 90 Shore "A" durometer rubber).

Each of the bearings 29 for the trunnions 27 of the heated roll 5 comprises a cylindric bearing housing indicated in its entirety by the reference numeral 35 mounted in the respective side frame member 25a, 25b. Referring to FIG. 7, bearing 29 is shown as comprising an outer race 37 mounted in the housing 35, an inner race 39 in the outer race fixed on the respective trunnion 27, with an annular space 41 between the races, and rolling elements, more particularly rollers 43, between the races, the bearing being a tapered roller bearing.

Each of the bearings 33 for the trunnions 31 of the anvil roll 7 comprises a cylindric bearing housing indicated in its entirety by the reference numeral 45 mounted in the respective side frame member 25a, 25b. Each bearing 33 comprises an outer race 47 mounted in the housing 45, an inner race 49 in the outer race fixed on the respective trunnion 31 with an annular space 51 between the races, and rolling elements, more particularly rollers 53, between the races, the bearing being a tapered roller bearing.

The side frame members 25a, 25b extend up from a base plate 55 on which they are fastened down by clamps as indicated at 57. The base plate is supported on a table structure 58. The frame 21 (side members 25a, 25b and cross-bar 25c) are adjustable laterally with respect to the apparatus on the base plate, the clamps being loosened, by means indicated at 59 including an adjusting screw 61 associated with the side frame member 25b on the operator's side of the apparatus and a handwheel 63 for turning the screw, with a clamp indicated at 65. Each bearing housing 33 is mounted in a block 67 seated in fixed position in the respective side frame member 25a, 25b at the lower end 69 of the lower part 71a of a slot, designated 71 in its entirety extending down in the side frame member from its upper end. Each bearing housing 35 is mounted in a block 73 vertically slidable in a wider upper part 71b of the slot 71 above the block 67. The block 73 has side guides 74 guiding it for up and down movement in the slot. Each of the lower blocks 67 is releasably held in fixed position seated in the lower part 71a of slot 71 by screws indicated at 67a accessible through holes indicated at 67b in the side frame members 25a, 25b. Each of the upper blocks 73 has stop spacers 73a at the bottom thereof engageable with step 71c of the slot 71 determining its fixed position in the upper part 71b of the slot 71.

Each side frame member 25a, 25b has a head 75 at its upper end. On each head is an air cylinder 77 having piston rod 79 extending down from the piston (not shown) therein through an opening 81 in the head 75, the piston rod having a cross-head structure 83 at its lower end releasably fastened by screws 83a to the respective block 73. Pressurized air is supplied to the upper ends of the air cylinders above the pistons therein to push the blocks 73 down to their fixed position determined by spacers 73a thereby to hold down the bearings 29, the trunnions 27 and the heated roll 5. The air cylinders 77 may also be utilized to pull blocks 73 up to lift roll 5 off roll 7 as on shut-down of the apparatus, the lift being limited by screw stops 78.

Each block 73 is formed for releasably clamping the respective upper bearing housing 35 therein, being of rectangular outline with a generally circular opening 85 therein receiving the respective cylindrical bearing housing 35, and being split as indicated at 87 at the top. Each block 73 is provided with a clamp screw 89 having a knob 91 at its outer end for drawing together the upper parts of the block at the split for clamping the respective bearing housing 35 therein.

Each block 67 is similarly formed for releasably clamping the respective lower bearing housing 33 therein, being of rectangular outline with a generally circular opening 93 therein receiving the respective bearing housing 45 and being split as indicated at 95 at the top of the block. Each block 67 is similarly provided with a clamp screw 97 having a knob 99 at its outer end for drawing together the upper parts of the block at the split for clamping the respective bearing housing 33 therein. Each of the bearing housings 33 is rotatable on a generally horizontal axis in its block 67 with the block loosened, and the axis of the bearing in the housing (the axis of the trunnion 31) is slightly eccentric with respect to housing axis.

Figure 4:
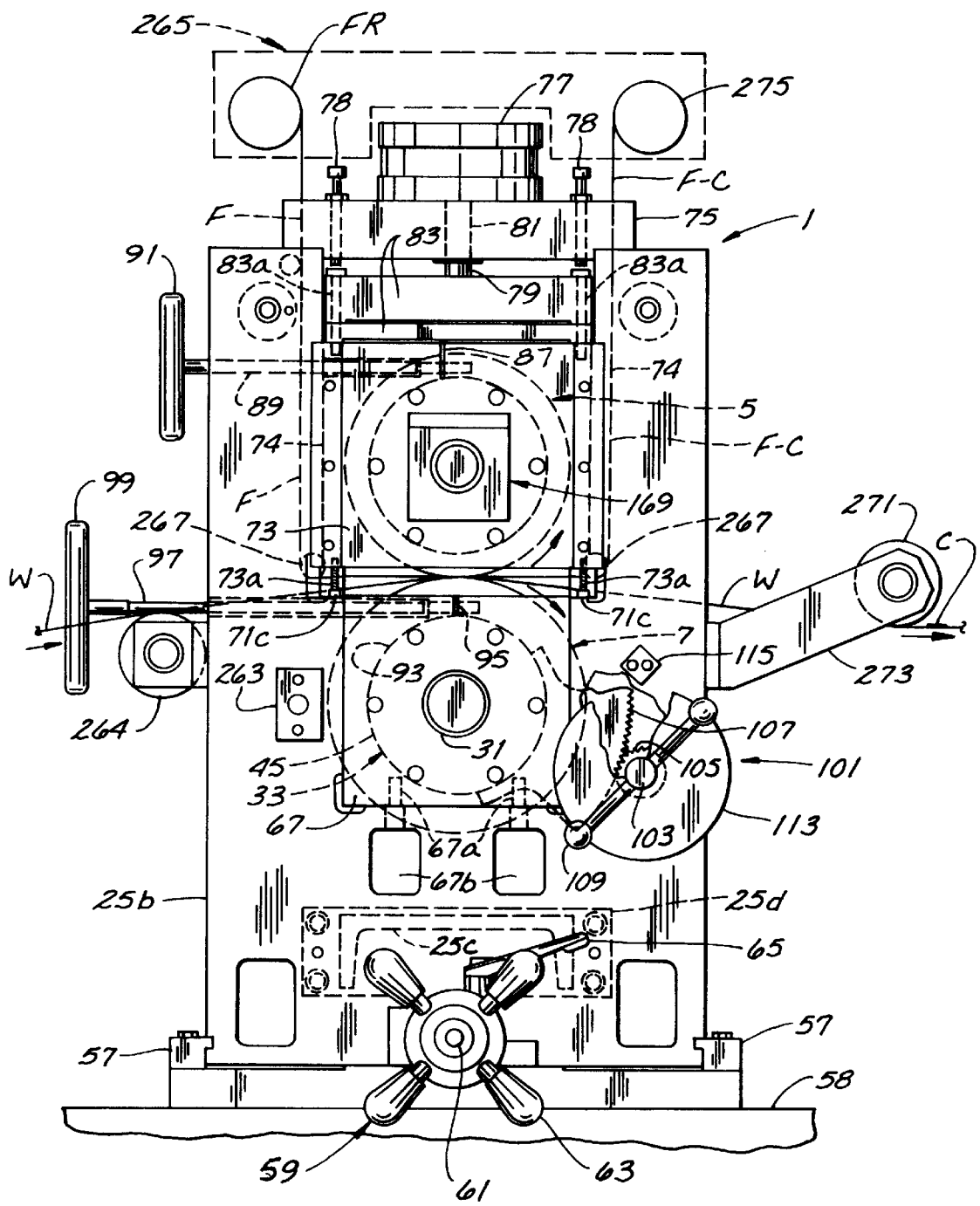
FIG. 4 is a view in side elevation of the stamping apparatus taken from the operator's side of the apparatus, with parts broken away to show interior detail.

At 101 in FIG. 4 is generally indicated means for rotating each of the bearing housings 45 in the respective blocks 67 on the axis of the housing for up and down adjustment of the eccentric axis of the bearing with respect to the respective block and hence the frame 21. This means 101 comprises a shaft 103 extending horizontally across the apparatus journalled adjacent its ends in the side frame members and having pinions 105 thereon on the inside of the side frame members in mesh 20 with gear segments 107 on the respective bearing housings. The shaft is rotatable one way and the other by a crank 109 on its end at the operator's side of the apparatus. At 111 is indicated an eccentric housing to remove backlash from gear set 105/107. A gauge constituted by a disk 113 on the shaft on the outside of side frame member 25b and a pointer 115 on member 25b is provided for reading the elevation of the axis. See FIG. 2 for markings on the disk as indicated at 116.

The rolls 5 and 7 are driven in the direction for feeding webs W and F forward, i.e. in the direction from left to right as shown in FIGS. 1, 2 and 4, by an electric motor 117 via a timing belt and pulley drive indicated at 119, including a pulley 121 on the outer end of the drive side trunnion 31 of the roll 7, and gearing 123 for driving roll 5 from roll 7 with roll 5 driven counterclockwise as viewed in FIGS. 2 and 4 and roll 7 driven clockwise. The motor 117 is mounted on a bracket 125 on the left-hand (drive side) side frame member 25a. The gearing comprises a gear 127 on the left-hand trunnion 31 of the anvil roll 7 meshing with a gear 129 on the left-hand trunnion 27 of the heated roll 5. Means for tensioning the timing belt of the belt and pulley drive 119 is indicated at 130.

The heated roll 5 comprises a relatively thin-walled hollow cylindrical shell or sleeve 131, telescoped on and surrounding a generally cylindric core 133, both of steel for example (see particularly FIGS. 8 and 9). The shell is longer than the core and has end portions 135 which extend beyond the core at both ends of the core. The core has a multiplicity of grooves 137 extending in axial direction with respect to the core from one end to the other end thereof in its periphery. The shell 131 is shrunk on the core 133 so that its internal cylindrical surface 139 contacts to the external surfaces of the ribs or lands 141 on the core which bound the grooves 137 at opposite sides of the grooves, whereby the grooves in conjunction with the shell form channels also designated 137 extending lengthwise of the heated roll adjacent the periphery thereof for flow therethrough of hot liquid, more particularly hot oil, from one end of the heated roll to the other (from its left end to its right end as illustrated in FIG. 8). The construction of the heated roll 5 is similar to that of the heated rolls described in the above-noted '757 patent, to which reference may be made for further details.

Each of the trunnions 27 of the heated roll 5 comprises an elongate tubular cylindric shaft 143 having what may be termed a head designated in its entirety by the reference numeral 145 at one end thereof constituting its inner end with respect to the roll 5, said head comprising an outer circular plate or disk 147 having a diameter corresponding to the internal diameter of the shell 131. Each disk 147, which constitutes an end head or end wall for the heated roller 5, has a cylindrical boss 149 coaxial therewith (and coaxial with the shaft 143) on the side thereof (its inner side) toward the core 133. The boss is of disk-like form having a flat circular inner face 151 engaging the respective end of the core (each end of the core being flat in a plane transverse to the axis of the core).

The disk 147 of the end head 145 of each shaft 143 is fitted in the respective projecting end 135 of the shell to the point where the face 151 of the boss 149 engages the respective end of the core 133, has an annular peripheral recess 153 at the outside peripheral edge thereof, and is welded in the projecting end 135 of the shell by weldment in this recess as indicated at 155. With each trunnion end head 145 so constructed and so arranged and welded in the ends of the shell 131, the heated roll 5 has an annular space or chamber 157 surrounding each boss 149, each chamber being defined by the outer periphery of the boss, the face of the disk 147 opposed to the end of the core 133, and the inside annular surface of the projecting end 135 of the shell and the end face of the core.

Each of the trunnion shafts 143 and the respective head 145 have an axial bore designated in its entirety by the reference numeral 159, said bore having an elongate portion 159a extending from the outer end of the shaft to the inner end of the shaft and partly into the outer disk 147, and a stepped-down portion 159b (i.e. a portion of smaller diameter than portion 159a) extending centrally through the outer disk with a continuation 159c of portion 159b in the boss, all terminating in a central recess 159d in the core. The elongate portion 159a of bore 159 in the shaft 143 is lined from one end thereof to the other with thermal insulation material, preferably TEFLON, as indicated at 161.

Each boss 149 has radial passages 163 extending between the continuation 159c of the bore 159 and the periphery of the boss providing communication between the inner end of the bore in the respective trunnion 27 and the respective chamber 157. The arrangement is such as to provide for flow of oil to the heated roll 5 through the bore 159 of one of the trunnions, herein the left-end trunnion as shown in FIGS. 6 and 7 on the drive side of the apparatus, through the radial passages 163 in the boss 149 at the left end of the roll 5 to the space 157 around the left-hand boss constituting an annular manifold in communication with channels 137, thence through these channels to the annular space 157 surrounding the boss at the right-hand end of the roll 5, thence inwardly through the radial passages 163 in the boss at the right-hand end of the roll 5, and out through the bore 159 in the right-hand trunnion 27. The space 157 in the heated roll 5 at its right end may be referred to as an annular manifold for receiving the oil flowing out of the right-hand ends of the channels 137.

Figure 13:
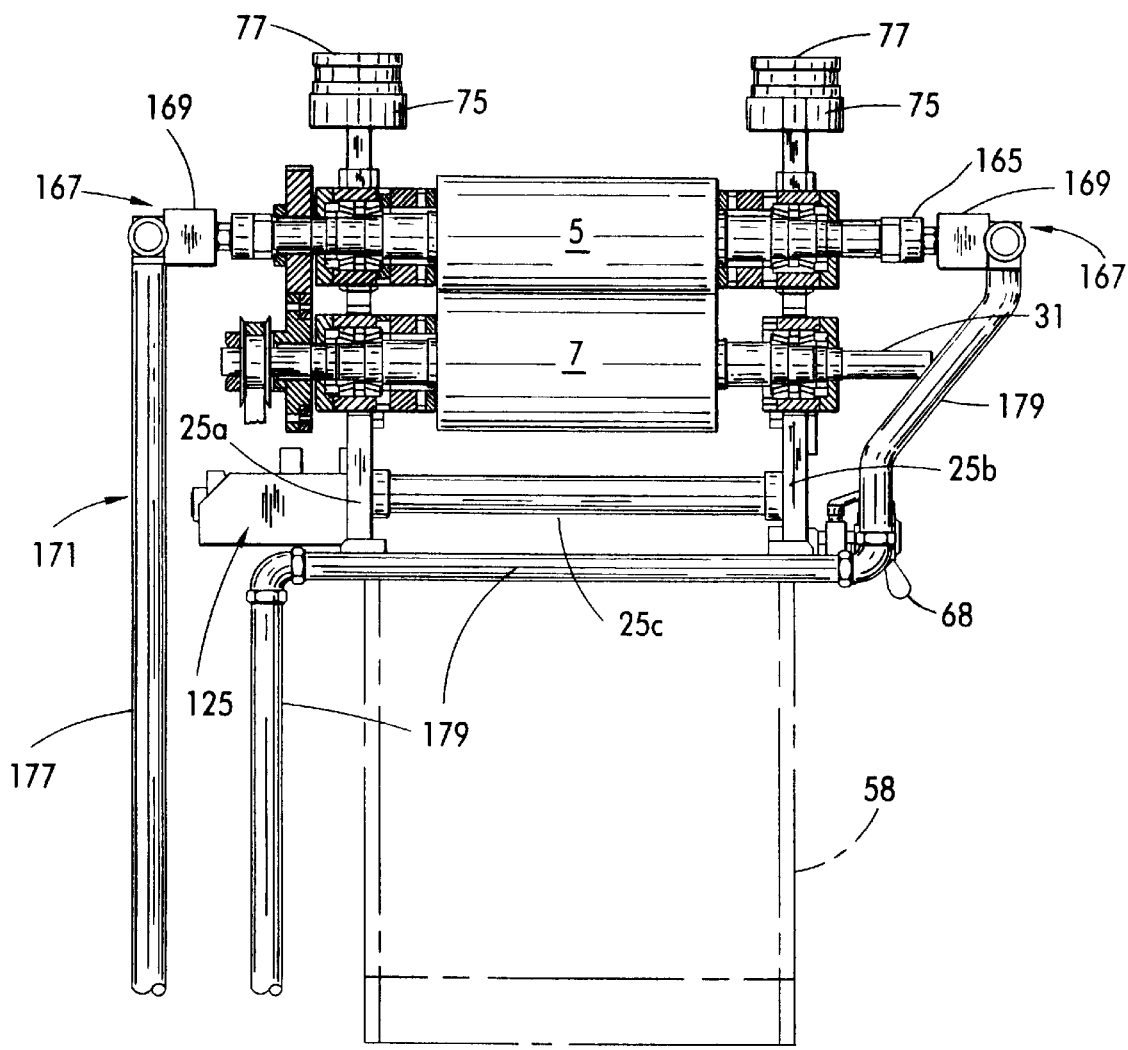
FIG. 13 is a semi diagrammatic view generally on line 13—13 of FIG. 5 showing part of the hot oil circuitry for heating the heated roll.

Each trunnion 27 extends outward from the respective end of the shell/core assembly 131, 133 coaxially therewith, and has a rotary coupling element 165 of a rotary union 167 secured thereon at its outer end. This rotary coupling element 165 is rotary in a fixed rotary coupling element 169 for connection of the heated roll 5 in a hydraulic system or circuit shown in FIGS. 5 and 13 indicated in its entirety by the reference numeral 171 for flow of heated liquid (e.g. oil) through the channels 137 in the roll for heating the shell 131 thereof. Referring to FIGS. 5 and 13, the stated hydraulic circuit 171 is shown to comprise an oil tank 173 having means diagrammed at 175 for heating the oil therein to a predetermined desired temperature, an oil delivery pipe line 177 for delivery of oil from the tank to the fixed rotary coupling element 169 for the trunnion 27 on the drive side of the apparatus, and an oil return pipe line 179 for return of oil to the tank from the fixed rotary coupling element 169 for the trunnion 27 on the operator's side of the apparatus, the circuit including a pump diagrammed at 176 for pumping heated oil from the tank 173 through pipe line 177, the trunnion 27 on the drive side of the apparatus, through the passages 163 of the boss 149 and the annular manifold 157 on the drive side of the apparatus, from left to right through the channels 137 in the heated roll 5, and the manifold 157 and passages 163 at the operator's side of the apparatus, the trunnion 27 on the operator's side of the apparatus, and thence through the oil return pipe 179 to the tank. Tank 173 may be a TUC heater sold by TUC of Holland, Mich.

As above described, the heated roll 5 has the two raised areas 5A and 5B on the shell 131 functioning as heated dies for effecting the hot stamping of the foil web F, these raised areas being spaced at 180° intervals around the periphery of the shell to stamp out chips C from web F with the chips becoming adhered to the web W spaced at intervals along the length of the web. With the two dies 5A, 5B spaced at 180° around the shell, the chips are spaced along the length of the web w at intervals corresponding to half the circumference of the shell of the heated roll. The raised areas or dies 5A and 5B are very thin in relation to the diameter of the heated roll; for example, in a physical embodiment of the apparatus wherein the heated roll has an overall length of 18 inches (for handling webs W up to 16 inches wide) and an external diameter of approximately 7.632 inches, the outside surface of each die which contacts the foil web F on each revolution of roll 5 is raised 0.014 inch from the cylindrical outer surface of the shell of the roll 5, and, as shown, may be of square outline approximately 0.600 inch on a side with corners rounded on a radius of 0.045 inch and having a 5 RMS finish as shown in FIGS. 6, 8 and 8A. The apparatus with the stated dimensions for the heated roll and with the two dies spaced at 180° intervals around the roll applies chips C approximately 0.600 inch square at approximately twelve inch intervals (one-half the circumference of roll 5) to the web W for ultimate cutting of web W into sheets twelve (one-half of 7.632π) inches long each bearing a hologram.

A cooling system designated in its entirety by the reference numeral 181 (see FIG. 14) is provided for cooling the bearings 29 for the trunnions 27 of the heated roll 5, for cooling the bearings 33 for the trunnions 31 of the anvil roll 7 and for cooling the trunnions 27 of the heated roll 5 in addition to the cooling of the bearings 29. The cooling system 181 includes passaging indicated generally at 183 in each of the housings 35 for the bearings 29 for flow of oil as a coolant and lubricant to one side of the space 41 between the inner and outer races 39 and 37 of the bearings, thence through said space and thence from said space out of the housing. Passaging 183 has an inlet 185 for delivery of coolant to an annular space 187 at one side of the races and an outlet 189 for exit of coolant from an annular space 191 at the other side of the races.

The cooling system 181 further includes passaging indicated generally at 193 in each of the housings 45 for the bearings 33 for flow of oil as a coolant and lubricant to one side of the space 51 between the inner and outer races of these bearings, thence through said space and thence from said space out of the housing 45. Passaging 193 has an inlet 195 for delivery of coolant to an annular space 197 at one side of said races and an outlet 199 for exit of coolant from an annular space 201 at the other side of said races.

For cooling each of the trunnions 27 of the heated roll 5, the cooling system 181 includes an annular body 203 (see FIGS. 6, 7, 10 and 11) surrounding each trunnion attached to the side of the respective bearing housing 35 toward the respective end of roll 5 (the inner side of the bearing housing). Each of these annular bodies 203 has a cooling chamber 205 formed by an internal annular recess therein surrounding the respective trunnion for flow therethrough of coolant in heat-transfer relation with the respective trunnion 27 for direct cooling of the trunnion in the region thereof between the respective bearing housing 35 and the respective end of the heated roll. Preferably, in accordance with this invention, each cooling chamber 205 has a helical rib or fin 207 therein extending from one end thereof to the other constituting a helical flow director forming a helical channel 209 around the respective trunnion 27 for flow of coolant through the cooling chamber in a helical path around the respective trunnion. Each cooling chamber 205 is located adjacent the respective end of the heated roll 5 between the respective end of the heated roll and the respective bearing housing 35 for effecting cooling of the respective trunnion 27 immediately outward of the respective end of the heated roll. As shown in FIG. 10 and in enlarged detail in FIG. 12, each trunnion 27 of the heated roll 5 is machined to have an external screw thread 211 over a portion of the length thereof within the cooling chamber 205, the helical rib 207 in the cooling chamber having an internal diameter slightly greater (e.g. 0.016" greater) than the external diameter of the screw-threaded portion of the trunnion. The coolant flows from inlet 213 in the cooling chamber body 203 at one end of the cooling chamber 205 in a helical path around the respective trunnion 27, also axially in a turbulent state in the clearance 212 between the screw-threaded portion of the trunnion and the inner edge of the helical rib or fin 207 from inlet 213 at said one end of the cooling chamber to coolant outlet 215 at the other end of the annular cooling chamber. The screw thread 211 causes turbulence in the axial flow of coolant for augmenting the heat transfer.

As illustrated, only the trunnions 27 of the heated roll 5 have the cooling chamber bodies 203 and cooling chambers 205. No such chambers are provided for the trunnions of the anvil roll 7 since the anvil roll is not heated and its trunnions do not need the special cooling feature provided for trunnions 27.

Figure 14:
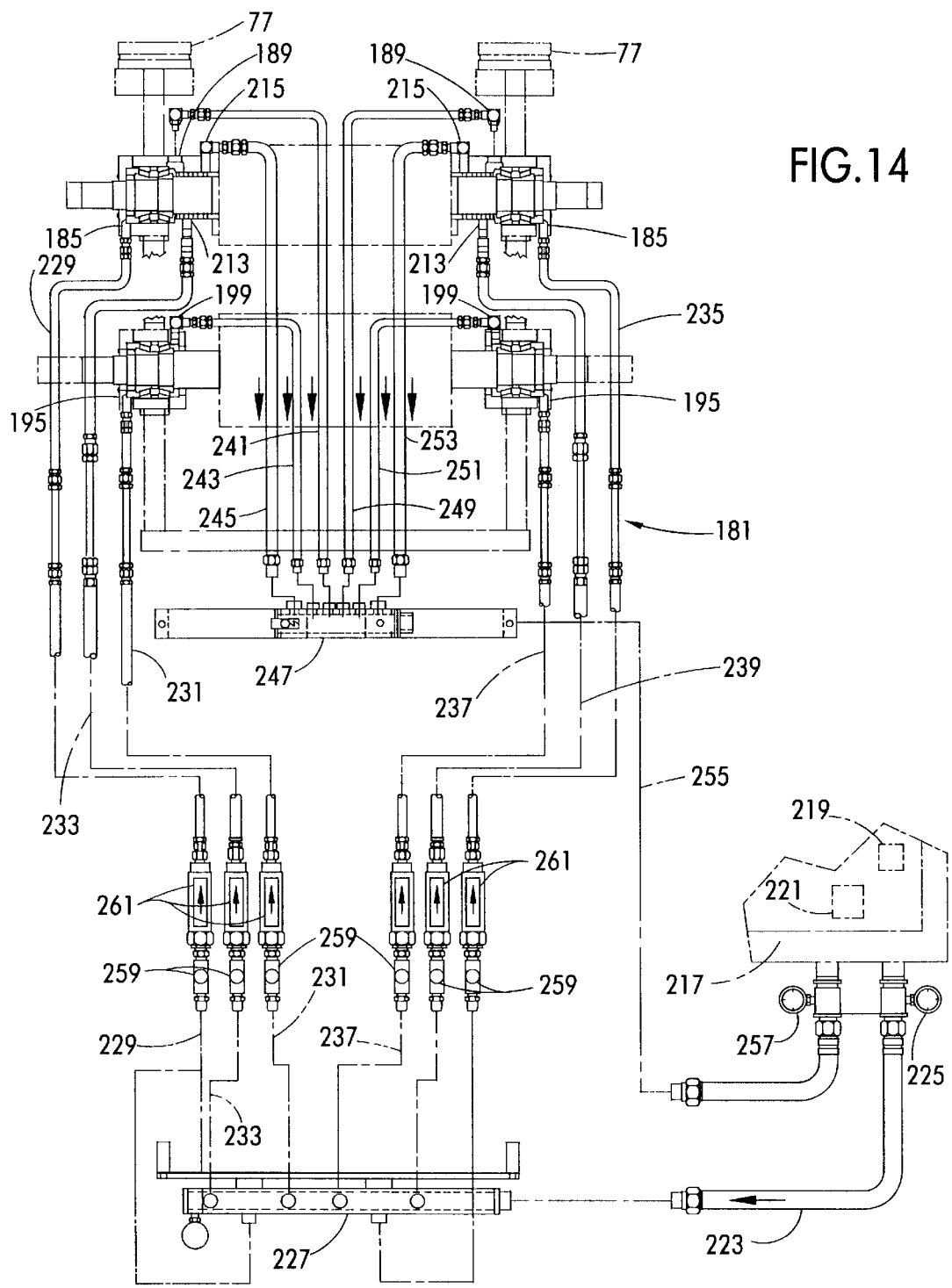
FIG. 14 is a diagrammatic view of the coolant circuitry.

The cooling system 181 as shown in FIG. 14 includes a source 217 of liquid coolant, oil being preferred and serving as a lubricant as well as coolant for the bearings, which comprises means diagrammed at 219 for cooling the coolant and a pump diagrammed at 221 for pumping the coolant through a coolant delivery line 223 including a pressure gauge 225 to a manifold 227. Source 217 may be a Koolout Kooler sold by Koolant Kooler, Inc. of Kalmazoo, Mich. Coolant delivery lines 229, 231 and 233 extend from the manifold to inlet 185 of the drive side bearing housing for passaging 183 therein, to inlet 195 in the drive side bearing housing for passaging 193 therein, and to inlet 213 in the drive side cooling chamber body 203 for channel 209 therein. Similarly, coolant delivery lines 235, 237 and 239 extend from the manifold 227 to the inlet 185 of the operator's side bearing housing for passaging 183 therein, to inlet 195 in the operator's side bearing housing for passaging 193 therein, and to inlet 213 in the operator's side cooling chamber body 203 for channel 209 therein. Coolant return lines 241, 243 and 245 extend from the drive side outlets 189, 199 and 215 to a return line manifold 247. Similarly, coolant return lines 249, 251 and 253 extend from the operator's side outlets 189, 199 and 215 to the return line manifold. A coolant return line 255 extends from the return manifold to the coolant source 217, this line including pressure gauge 257. Each of the six coolant delivery lines includes a needle valve 259 for regulating the rate of flow through the line and a flow meter 261.

Preferably, the stamping apparatus 1 comprises means for controlling the temperature of the coolant delivered by the coolant source 217 including a temperature sensor 263 (see FIG. 4) associated with the frame 21 and means responsive to the temperature sensor for controlling the coolant temperature to maintain a predetermined temperature differential between the temperature of the frame and the temperature of the coolant, with the coolant temperature lower than the frame temperature. This control means may correspond to that shown in the above-noted coassigned '496 patent, incorporated herein by reference, the temperature sensor 263 corresponding to the temperature sensor 56 of the '496 patent, reference being made to that patent for details of the control system including the temperature sensor mounted on the frame.

In the operation of the stamping apparatus 1 and the embossing apparatus 3, substrate web W is fed continuously forward (from left to right as shown in FIGS. 1, 2 and 4) at a predetermining speed by and between the heated roll 5 and the anvil roll 7, these rolls being driven by the motor 117 in forward feed direction as shown by the arrows in FIGS. 2 and 4. The web W travels over a guide roller 264. The foil web F is fed forward in increments of lesser length than the spacing of the chips C by a foil feeder and rewinder apparatus indicated at 265 in FIGS. 1 and 2, such as a Incremental Foil Feeder sold by UITS-America, Inc. of Blauvelt, New York, constructed and operable in the manner of the ribbon feed and rewinder shown in the above-noted '378 patent, incorporated herein by reference. The foil feeder and rewinder apparatus at 265 feeds the foil web F from a roll indicated at FR in FIG. 1 (indicated diagrammatically at FR in FIG. 4) around guide rollers including roll 267 shown in FIG. 4 generally at the level of the pass plane of rolls 5 and 7 into overlying relationship with the web W as the latter enters rolls 5 and 7. In operation of the stamping and embossing apparatus to apply chips C 0.600 inch square spaced at twelve-inch intervals, for example, the foil web F may be fed forward in one-inch increments, for example, with the result that in the F-C web (foil web minus chips) exiting the rolls 5, 7 the windows 13 (0.600 inch square) are spaced at one-inch intervals along the length of the F-C web center-to-center. Feeding the foil web in such increments, instead of feeding twelve inches of the foil web for each twelve inches of the substrate web, greatly reduces the amount of F-C web needing recycling. The foil feeder and rewinder apparatus is secured on the frame 25 as indicated at 269 in FIGS. 1 and 2.

As the webs F and W are fed forward between rolls 5 and 7, web F being superimposed on web W off-center with respect to web W in line with the stamping dies 5A and 5B on roll 5, on each successive half-revolution of roll 5, the hot die 5A stamps out a chip C and the hot die 5B stamps out a chip C, the chips becoming adhered to web W spaced at intervals equal to half the circumference of roll 5 (e.g. twelve-inch intervals). Generally, the foil web F is pressed to some extent across its width into web W (backed by the anvil roll) and pressed farther into web W by each die over the area of the die. It may be efficacious to construct the anvil roll with a relatively hard but yielding rubber surface (e.g. rubber of 90 Shore "A" durometer) to enable stamping of the chips while maintaining contact of the rolls with web W across its width in the pass plane of the rolls.

The web W with chips C thereon spaced at intervals (e.g. sheet-length intervals) travels forward from the nip of rolls 5 and 7 under a guide roller 271 mounted on arms 273 extending forward from the side frame members 25a, 25b and thence through the embossing rolls 9 and 11 of the embossing apparatus 3, as shown in FIGS. 1 and 2, for embossing the chips C with holographic images as above stated. The F-C web issuing from rolls 5, 7 is rewound as indicated at 275 in FIGS. 2 and 4 by the winding means of the foil feeder and rewinder 265.

As above described, hot oil is circulated through the roll 5 for heating it at the periphery thereof, especially for heating the stamping dies 5A and 5B. In the above-noted physical embodiment of the invention, for example, the oil is heated generally to a temperature of 360° F. Oil as coolant and lubricant is circulated through the bearings 29 for the trunnions 27 of the heated roll 5, through the bearings 33 for the trunnions 31 of the anvil roll for cooling these bearings, and through each of the cooling chambers 205 in the stated helical path of the helical channel 209 therein around each trunnion 27 and axially in a turbulent state in clearance 212 for cooling each trunnion 27 in the region between the respective end of the roll 5 and the respective bearing 29. Since the anvil roll 7 is not heated, the rate of flow through its bearings 33 is preferably less than the rate of flow through the bearings 29 for the heated roll; for example, oil at 64° F., may be circulated through bearings 29 at the rate of approximately 2 gallons per minute and through bearings 33 at the rate of approximately 0.6 gallons per minute. Also, the rate of flow through chambers 205 is preferably higher than the rate of flow through bearings 29, being approximately 5 gallons per minute, for example. These rates may be set by the valves in the coolant delivery lines. The temperature of the coolant is controlled by sensor 263 and the means associated with said sensor such as disclosed in the '496 patent for maintaining a predetermined temperature differential between the frame and coolant temperatures.

The embossing apparatus 3 is essentially identical to the stamping apparatus 1, omitting the foil feeder and rewinder apparatus 265, having its own cooling system corresponding to the cooling system 181 shown in FIG. 14 for the stamping apparatus and its own heating system for its roll 9 corresponding to the hot oil circuit 171 shown in FIG. 13 for the stamping apparatus, and having hologram embossing dies such as indicated at 276 in FIG. 15 on the roll 9 in place of stamping dies 5A and 5B, the embossing dies being engraved to emboss chips C each with a holographic image.

Preferably the anvil roll 11 of the embossing apparatus has a relatively hard rubber surface, e.g. 60 Shore "D" durometer rubber as indicated at 278 in FIG. 15, the rubber comprising a surface layer from about 0.010 to 0.100 inch thick on a steel roll, the holographic embossing being improved by use of an anvil roll with such a hard rubber surface. Further differences involve omission of roll 264, making knob 99 closer to the frame, and provision of roll 277 as shown in FIG. 2 instead of roll 271. Operation of the embossing apparatus in phase with the operation of the stamping apparatus is effected in suitable manner not constituting part of the present invention.

As to each of the stamping and embossing devices 1 and 3, with the trunnions 27 of the heated roll 5 cooled as described in addition to the cooling of the bearings of each of the rolls 5 and 7, and with the other features of the devices as above described, the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Web heating and pressing apparatus comprising:

a frame;

a heated roll and an anvil roll each having trunnions at its ends journalled for rotation in bearings in the frame with the axes of the rolls at least substantially parallel and with the rolls so mounted as to provide a web pass plane between the rolls;

a cooling system for cooling the bearings for the trunnions of the heated roll, for cooling the bearings for the trunnions of the anvil roll, and for cooling the trunnions of the heated roll, said system comprising:

passaging for flow of coolant in heat-transfer relation with each of the bearings for the trunnions of the heated roll, passaging for flow of coolant in heat-transfer relation with each of the bearings for the trunnions of the anvil roll, and cooling chambers for flow of coolant therethrough in heat-transfer relation to the trunnions of the heated roll, said passaging and cooling chambers being connected in a circuit for circulation of coolant therethrough for cooling the bearings of each roll and the trunnions of the heated roll.

2. Apparatus as set forth in claim 1 wherein each cooling chamber is formed by an internal annular recess in an annular body surrounding the respective trunnion of the heated roll, coolant in the chamber being in direct heat-transfer contact with the periphery of said respective trunnion.

3. Apparatus as set forth in claim 2 wherein said cooling chamber has flow director means therein for flow of coolant through the chamber in a helical path around the respective trunnion.

4. Apparatus as set forth in claim 3 wherein the flow director means in each cooling chamber comprises a helical rib in said chamber forming a helical channel around the respective trunnion.

5. Apparatus as set forth in claim 4 having clearance between each helical rib and the portion of the respective trunnion extending therethrough for axial flow of coolant through said clearance.

6. Apparatus as set forth in claim 5 wherein said portion of each trunnion is formed to cause turbulence in the axial flow of coolant.

7. Apparatus as set forth in claim 6 wherein said portion of each trunnion is screw-threaded to cause said turbulence.

8. Apparatus as set forth in claim 2 wherein each of said annular bodies is located adjacent the respective end of the heated roll surrounding the respective trunnion between the respective end of the heated roll and the bearing for the respective trunnion.

9. Apparatus as set forth in claim 8 wherein each annular body is fastened to the respective bearing on the inside thereof.

10. Apparatus as set forth in claim 1 wherein each of the bearings for the trunnions of each roll comprises a bearing housing mounted in the frame, an outer race in the housing, an inner race in the outer race fixed on the respective trunnion with an annular space between the races, and rolling elements between the races, each housing including passaging for flow of coolant through the space therein from one side of said space to the other.

11. Apparatus as set forth in claim 1 employing oil as the coolant wherein said circuit comprises an oil cooler, oil lines for delivery of oil from said cooler to and through said passaging and said cooling chamber and oil lines for returning oil from said passaging and cooling chamber to the cooler.

12. Apparatus as set forth in claim 1 having valve means in said circuit for regulating the rate of flow through the first-mentioned passaging to be higher than the rate of flow through the second-mentioned passaging and the rate of flow through the cooling chambers to be higher than the rate of flow through the first-mentioned passaging.

13. Apparatus as set forth in claim 1 wherein each trunnion of the heated roll is tubular and thereby has a passage for flow therethrough of hot fluid for heating the heated roll, wherein the heated roll is passaged for flow therethrough of the hot fluid from the one trunnion at one end of the heated roll to the other trunnion at the other end of the heated roll in a path such as to provide for heat transfer from the hot fluid to the surface of the heated roll, and wherein the trunnions of the heated roll and the heated roll are connected in a circuit including a source of heated fluid, a fluid delivery line for flow of hot fluid from the source to a rotary fluid union at the outer end of the trunnion at one end of the heated roll, a rotary fluid union at the outer end of the trunnion at the other end of the heated roll, and a fluid return line for flow of fluid from the latter rotary fluid union to said source of hot fluid.

14. Apparatus as set forth in claim 13 wherein said heated roll comprises a core, a shell on the core having end portions extending beyond the core at each end of the heated roll, the trunnions for the heated roll having heads in the ends of the shell formed to provide annular fluid manifolds in the heated roll at the ends thereof, said heated roll having channels for flow of heated fluid from the manifold at one end thereof to the manifold at the other end thereof on the inside of the shell, said heads being passaged for fluid communication of the passage in each trunnion of the heated roll with the manifold at the respective end of the heated roll, said heated roll having thermal insulation lining in the passages of the trunnions of the heated roll thereof.

15. Apparatus as set forth in claim 14 having at least one die on the shell for hot pressing web travelling between the rolls over an area of the web.

16. Apparatus as set forth in claim 1 wherein each of the bearings for the trunnions of the heated roll is maintained at a predetermined elevation in the frame and with the heated roll above the anvil roll, the bearings for the trunnions of the anvil roll are mounted in the frame for adjustment of the elevation of the anvil roll, and wherein the apparatus has means for simultaneous adjustment of the bearings for the trunnions of the anvil roll for adjustment of the elevation of the anvil roll.

17. Apparatus as set forth in claim 16 wherein the bearings for the trunnions of the heated roll are mounted for up and down movement in the frame, and wherein the apparatus has means pushing the bearings for the trunnions of the heated roll down to a fixed position determinative of said predetermined elevation of said bearings for the trunnions of the heated roll.

18. Apparatus as set forth in claim 17 wherein said pushing means comprises, for each of the bearings for the trunnions of the heated roll, an air cylinder operable for pushing down on and also pulling up said bearings for the trunnions of the heated roll.

19. Apparatus as set forth in claim 17 wherein each bearing comprises a cylindrical bearing housing, and wherein each said housing is clamped in a block mounted in the frame, the blocks for the bearings of the anvil roll being mounted in position in the frame, the bearing housing of each of the bearings for the trunnions of the anvil roll being rotatable in the respective block on being unclamped for said adjustment of the elevation of the anvil roll.

* * * * *